(12) United States Patent
Tsuchiya et al.

(10) Patent No.: US 10,901,267 B2
(45) Date of Patent: Jan. 26, 2021

(54) ALIGNMENT FILM AND LIQUID CRYSTAL DISPLAY DEVICE

(71) Applicant: SHARP KABUSHIKI KAISHA, Sakai (JP)

(72) Inventors: Hiroshi Tsuchiya, Sakai (JP); Masanobu Mizusaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 222 days.

(21) Appl. No.: 15/780,830

(22) PCT Filed: Nov. 28, 2016

(86) PCT No.: PCT/JP2016/085087
§ 371 (c)(1),
(2) Date: Jun. 1, 2018

(87) PCT Pub. No.: WO2017/094634
PCT Pub. Date: Jun. 8, 2017

(65) Prior Publication Data
US 2018/0373098 A1 Dec. 27, 2018

(30) Foreign Application Priority Data

Dec. 4, 2015 (JP) .................................. 2015-237955

(51) Int. Cl.
*G02F 1/1337* (2006.01)
*C09D 183/08* (2006.01)
(Continued)

(52) U.S. Cl.
CPC ... *G02F 1/133723* (2013.01); *C08G 73/1078* (2013.01); *C09D 183/08* (2013.01);
(Continued)

(58) Field of Classification Search
CPC ............ G02F 1/133723; G02F 1/1337; G02F 1/134309; G02F 2001/134372;
(Continued)

(56) References Cited

U.S. PATENT DOCUMENTS

2003/0075715 A1 4/2003 Satoh et al.
2012/0021141 A1 1/2012 Yoo et al.
2017/0184922 A1* 6/2017 Park .................. G02F 1/133711

FOREIGN PATENT DOCUMENTS

JP 2003-092410 A 3/2003

\* cited by examiner

*Primary Examiner* — Ruiyun Zhang
(74) *Attorney, Agent, or Firm* — ScienBiziP, P.C.

(57) ABSTRACT

The present invention aims to provide an alignment film capable of sufficiently reducing image sticking and stain in a liquid crystal display device, and a liquid crystal display device including a photo-alignment film and sufficiently reducing image sticking and stain. The alignment film of the present invention contains a polymer containing a nitrogen radical-containing group, and a photo-functional group. The nitrogen radical-containing group is preferably a hydrazyl radical-containing group represented by the following formula (I) or (II):

[Chem. 1]

(I)

(Continued)

-continued
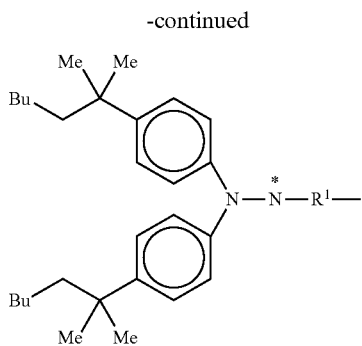
(II)
wherein R¹ is a direct bond or a divalent organic group; Me is a methyl group; and Bu is a butyl group.
9 Claims, 4 Drawing Sheets
(51) Int. Cl.
    *C08G 73/10*     (2006.01)
    *G02F 1/1343*     (2006.01)
    *C08G 77/26*     (2006.01)
    *C08G 77/16*     (2006.01)
    *C08G 77/18*     (2006.01)
    *G02F 1/13357*     (2006.01)
    *G02F 1/1339*     (2006.01)
(52) U.S. Cl.
    CPC ...... *G02F 1/1337* (2013.01); *G02F 1/133788* (2013.01); *G02F 1/134309* (2013.01); *C08G 73/1082* (2013.01); *C08G 77/16* (2013.01); *C08G 77/18* (2013.01); *C08G 77/26* (2013.01); *G02F 1/1339* (2013.01); *G02F 1/133602* (2013.01); *G02F 2001/134372* (2013.01); *G02F 2202/022* (2013.01)
(58) Field of Classification Search
    CPC .............. G02F 2202/022; C08G 73/10; C08G 73/1082; C08G 77/16; C08G 77/18; Y10T 428/10; Y10T 428/1005; Y10T 428/1023
    USPC ........ 428/1.1, 1.2, 1.23, 1.26; 349/123, 131; 430/20
    See application file for complete search history.

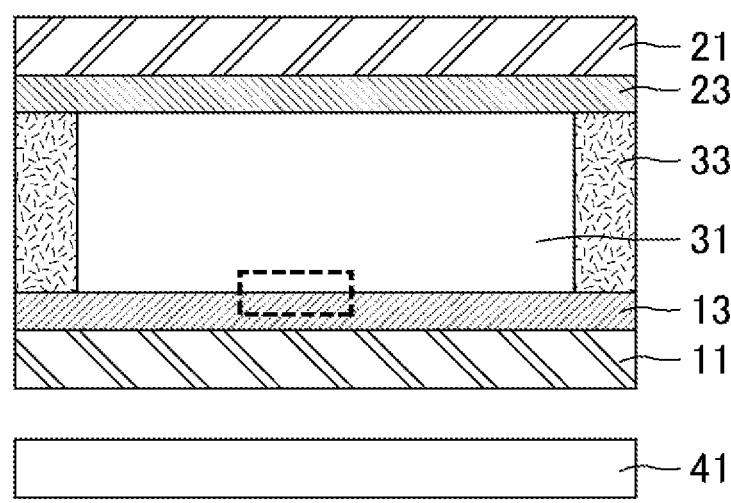

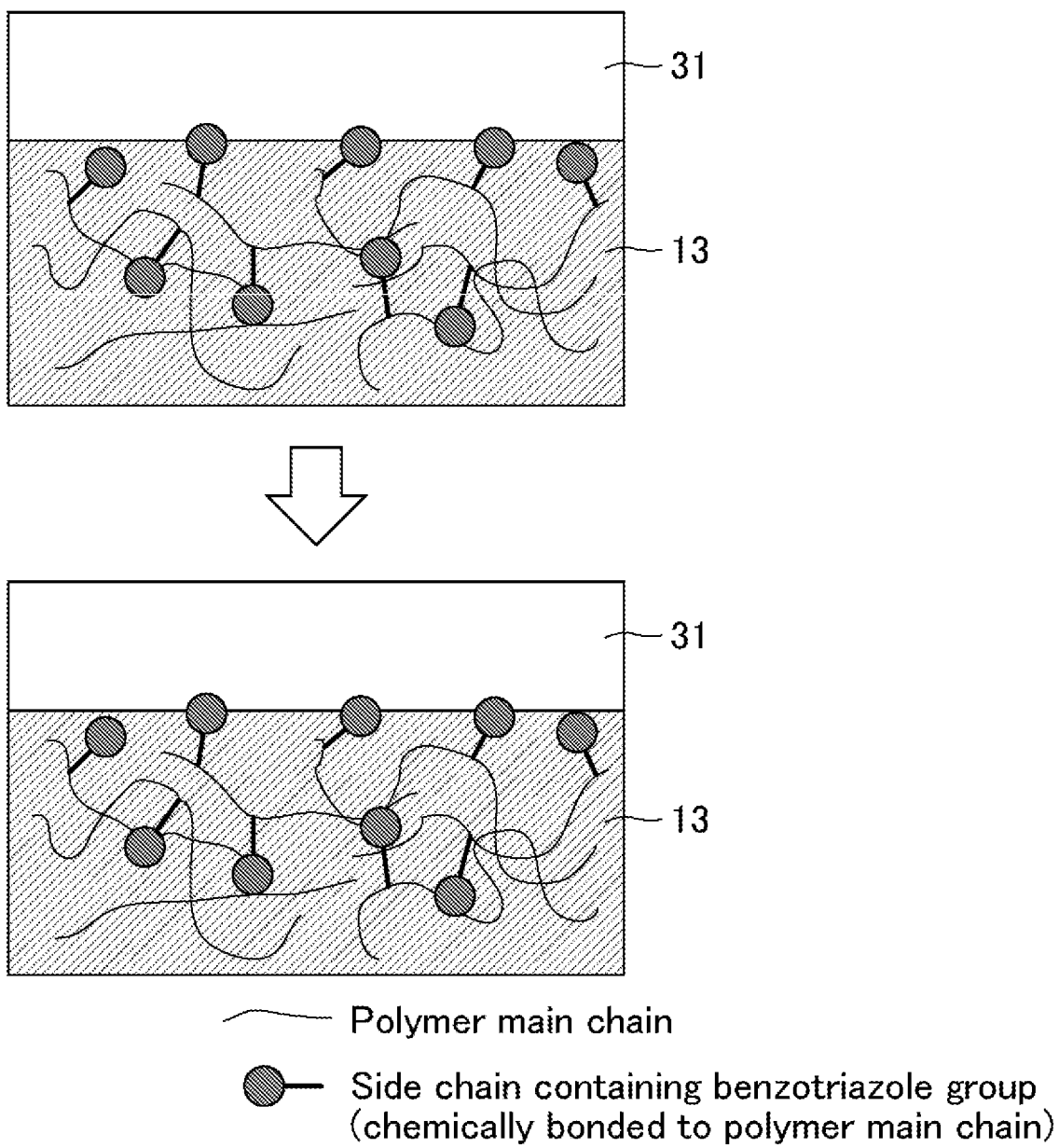

$P_{AL}$: Photo-functional group in photo-alignment film
$R_{AL}$: Radicals generated from photo-alignment film (1) Radicals are dissolved in liquid crystal layer and ionized (2) Radicals dissolved are transferred to liquid crystal molecules and ionized

ALIGNMENT FILM AND LIQUID CRYSTAL DISPLAY DEVICE

TECHNICAL FIELD

The present invention relates to alignment films and liquid crystal display devices. The present invention specifically relates to a photo-alignment film containing a photo-functional group and a liquid crystal display device including a photo-alignment film.

BACKGROUND ART

Display devices such as liquid crystal display devices have rapidly spread in recent years and are used not only for televisions but also for a wide variety of devices such as electronic book readers, digital photo frames, industrial appliances, personal computers (PCs), tablet PCs, and smartphones. These devices are required to have various properties for the respective uses, and various liquid crystal display modes are developed.

Examples of the liquid crystal display modes include modes in which liquid crystal molecules are aligned in a direction substantially parallel to the main surfaces of the substrates when no voltage is applied (hereinafter, also referred to as horizontal alignment modes) such as the in-plane switching (IPS) mode and the fringe field switching (FFS) mode. Examples of the liquid crystal display modes also include modes in which liquid crystal molecules are aligned in a direction substantially perpendicular to the main surfaces of the substrates when no voltage is applied (hereinafter, also referred to as vertical alignment modes) such as the vertical alignment (VA) mode. In order to achieve such alignment control of liquid crystal molecules, use of an alignment film is proposed. For example, Patent Literature 1 discloses formation of a polymer by polymerizing a monomer after an alignment film is formed from an alignment film material containing a multifunctional monomer in order to stabilize the alignment in the IPS mode for a long time.

Patent Literature 2 discloses that use of an organic compound containing a radical in a channel-forming region (semiconductor layer) of a TFT for a liquid crystal display can lead to a higher mobility than conventional organic compounds.

CITATION LIST

Patent Literature

Patent Literature 1: US 2012/0021141
Patent Literature 2: JP 2003-92410 A

SUMMARY OF INVENTION

Technical Problem

Liquid crystal displays including a photo-alignment film may suffer image sticking or stain after exposure to backlight illumination or other light from the outside for a long time, possibly causing a reduction in reliability.

The following describes the principle of occurrence of image sticking and stain in liquid crystal displays including a photo-alignment film.

FIG. 4 is a schematic diagram illustrating generation of radicals from a photo-alignment film, ionization of the radicals, transfer of the radicals to liquid crystal molecules, and generation of ions from the radicals transferred to the liquid crystal molecules.

(Generation of Radicals)
First, exposure of a liquid crystal panel to backlight illumination causes excitation of photo-functional groups in the photo-alignment film, generating radicals. The radicals are generated by cleavage of the photo-functional groups, for example.

(Ionization 1)
The radicals generated from the photo-functional groups in the photo-alignment film are dissolved in a liquid crystal layer, and the dissolved radicals are ionized.

(Ionization 2)
The radicals generated from the photo-functional groups in the photo-alignment film are dissolved in the liquid crystal layer, and are transferred from the photo-functional group to liquid crystal molecules, so that the liquid crystal molecules are ionized.

(Generation of Oxide)
The liquid crystal material contains an antioxidant in order to prevent generation of image sticking and stain due to oxides. The antioxidant eliminates oxygen from oxides in the liquid crystal molecules and the alignment film generated due to the influence of light and heat in the presence of oxygen. Still, when radicals are generated from the photo-functional groups in the photo-alignment film and directly react with the antioxidant, this antioxidant is consumed so that oxidation of liquid crystal molecules and the alignment film proceeds unfortunately. Oxides may also be converted into ions, which may cause a reduction in voltage holding ratio (VHR). Such ions accumulate at ends of the display of a panel and edges of a window pattern display to decrease the voltage holding ratio at these portions. As a result, the aforementioned image sticking and stain may occur. These defects seem to be visible when the luminance of the backlight is increased.

The present invention is devised in view of the above state of the art, and aims to provide an alignment film capable of sufficiently reducing image sticking and stain in liquid crystal display devices, and a liquid crystal display device including a photo-alignment film and capable of sufficiently reducing image sticking and stain.

Solution to Problem

The present inventors performed various studies on a liquid crystal display device including a photo-alignment film and reducing the aforementioned image sticking and stain to find that a photo-alignment film that contains a polymer containing a nitrogen radical-containing group (preferably, a hydrazyl radical-containing group) can scavenge radicals generated when photo-functional groups in the photo-alignment film absorb backlight illumination (for example, see FIG. 5). In FIG. 5, polymer portion 13p constituting the photo-alignment film is bonded to a photo-functional group 131 and a hydrazyl radical 13r, and the hydrazyl radical 13r scavenges radicals generated from the photo-functional group 131. Such a structure enables sufficient reduction in the aforementioned image sticking and stain. Instead of the method of introducing a nitrogen radical-containing group that scavenges radicals into a polymer side chain, another method may be considered in which a low-molecular-weight compound containing a nitrogen radical is added to an alignment film material. Still, in this method of adding a low-molecular-weight compound to an alignment film material, the low-molecular-weight compound is easily dissolved in a liquid crystal layer. In this case, the nitrogen radical of the low-molecular-weight compound dissolved causes a reduction in voltage holding ratio of the liquid crystal display. Further, in the method of adding a low-molecular-weight compound to an alignment film material, the low-molecular-weight compound may coagulate to cause alignment defects during alignment film formation. In contrast, no such coagulation occurs in the method of introducing a nitrogen radical-containing group into a polymer side chain by chemical bonding.

The present inventors arrived at the solution of the above problems owing to the above configuration, completing the present invention.

Specifically, one aspect of the present invention may be an alignment film including: a polymer containing a nitrogen radical-containing group; and a photo-functional group. Herein, the photo-functional group has only to be contained in the alignment film, and is preferably contained in the polymer containing a nitrogen radical-containing group.

Another aspect of the present invention may be a liquid crystal display device including: the above alignment film, a pair of substrates, a liquid crystal layer disposed between the substrates, and a backlight, the alignment film being disposed between at least one of the substrates and the liquid crystal layer. The pair of substrates herein means both of an "upper substrate" and a "lower substrate".

Patent Literature 2 discloses that the presence of an organic compound containing a nitrogen radical, particularly a hydrazyl radical, in a channel-forming region of a TFT leads to a higher mobility than in semiconductors containing a conventional organic compound. The invention of Reference 2 relates to liquid crystal displays, and specifically relates to a channel-forming region of a TFT. Reference 2 does not disclose reduction in image sticking and stain by introducing a nitrogen radical (preferably, a hydrazyl radical) into at least part of a polymer (e.g., polyamic acid, polyimide, or polysiloxane) constituting an alignment film.

In other words, the invention disclosed in Patent Literature 2 differs from the present invention in that a hydrazyl radical is not used in a photo-alignment film as in the present invention but used in a channel-forming region of a TFT (a carrier-forming region 16 in FIG. 1 of Patent Literature 2), and in that a nitrogen radical is not bonded to a polymer.

Advantageous Effects of Invention

The alignment film of the present invention is capable of sufficiently reducing image sticking and stain in liquid crystal display devices.

The liquid crystal display device of the present invention includes the photo-alignment film and is capable of sufficiently reducing image sticking and stain.

BRIEF DESCRIPTION OF THE DRAWINGS

FIG. 1 is a schematic cross-sectional view of the liquid crystal display device of the present invention.

FIG. 2 includes enlarged views of a portion indicated by dashed lines in FIG. 1, illustrating a long-term change of the portion.

DESCRIPTION OF EMBODIMENTS

Figure 3:
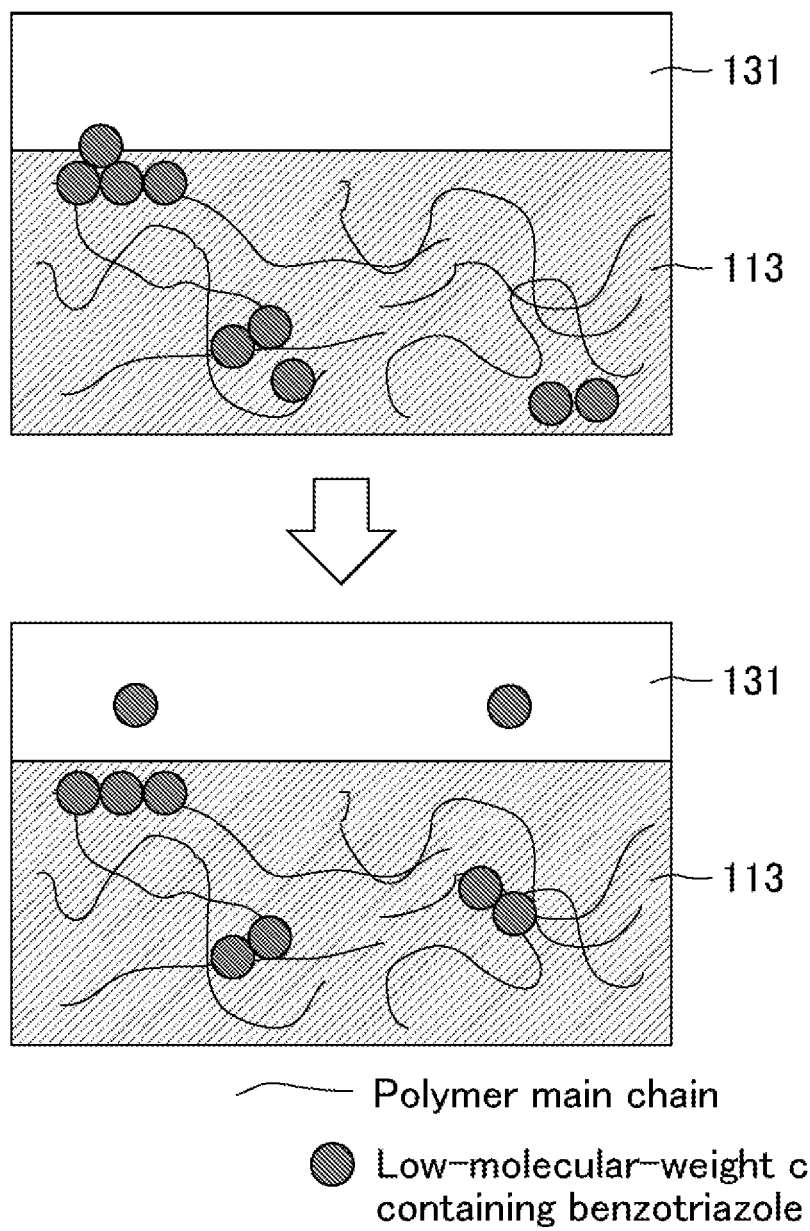
FIG. 3 includes views of a portion of a liquid crystal display device in which a low-molecular-weight compound is added to an alignment film material, illustrating a long-term change of the portion.
Figure 4:
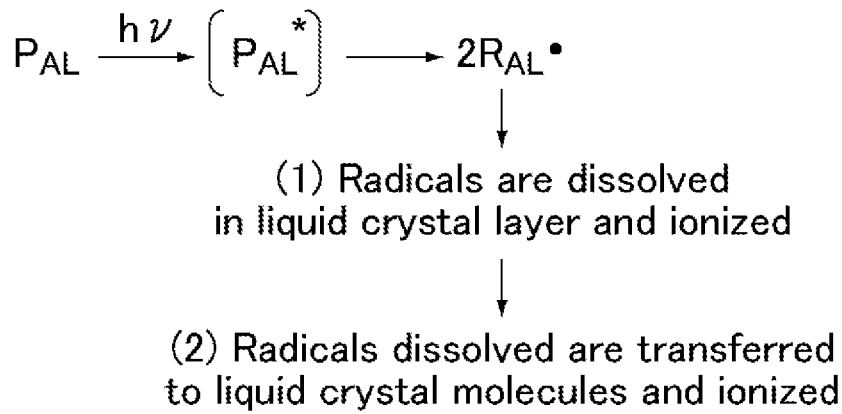
FIG. 4 is a schematic diagram illustrating generation of radicals from a photo-alignment film, ionization of the radicals, transfer of the radicals to liquid crystal molecules, and generation of ions from the radicals transferred to the liquid crystal molecules.
Figure 5:
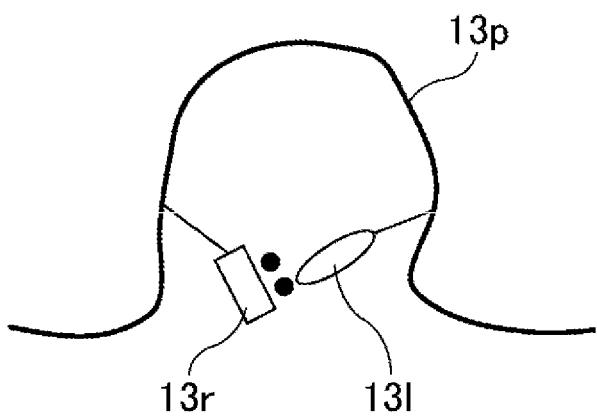
FIG. 5 is a schematic view of a hydrazyl radical-containing polymer constituting a photo-alignment film.

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

The photo-functional group herein may be any functional group that generates a radical by absorbing light at a wavelength within the wavelength range of ultraviolet light and/or visible light.

A mode in which liquid crystal molecules are aligned in a direction substantially parallel to the main surfaces of the substrates when no voltage is applied is also referred to as a horizontal alignment mode. The phrase "substantially parallel" means, for example, the pre-tilt angle of liquid crystal molecules is 0° or greater and 5° or smaller relative to the main surfaces of the substrates. A mode in which liquid crystal molecules are aligned in a direction substantially perpendicular to the main surfaces of the substrates when no voltage is applied is also referred to as a vertical alignment mode. The phrase "substantially perpendicular" means, for example, the pre-tilt angle of liquid crystal molecules is 85° or greater and 90° or smaller. The term "room temperature" herein means a temperature not lower than 15° C. and not higher than 30° C.

The present invention can be applied to both the horizontal alignment mode and the vertical alignment mode.

FIG. 1 is a schematic cross-sectional view of the liquid crystal display device of the present invention. As illustrated in FIG. 1, the liquid crystal display device includes a lower glass substrate 11, an upper glass substrate 21 facing the lower glass substrate 11, a liquid crystal layer 31 and a seal 33 disposed between the substrates, and alignment films 13 and 23. The alignment film 13 is disposed between the lower glass substrate 11 and the liquid crystal layer 31. The alignment film 23 is disposed between the upper glass substrate 21 and the liquid crystal layer 31. The seal 33 encloses the liquid crystal layer 31. The liquid crystal display device further includes a backlight 41 below (on the back surface side of) the lower glass substrate 11. The liquid crystal display device may further include a pair of polarizers, one of which is on the surface of the lower glass substrate 11 opposite to the liquid crystal layer 31 and the other of which is on the surface of the upper glass substrate 21 opposite to the liquid crystal layer 31.

The liquid crystal display device of the present invention further includes components such as a thin film transistor element appropriately disposed on the lower glass substrate 11 which serves as a support, and a pair of comb-shaped electrodes composed of a pixel electrode and a common electrode on part of an insulating layer covering the components such as the thin film transistor element. The material of the pixel electrode and the common electrode to be favorably used is indium tin oxide (ITO) or indium zinc oxide (IZO). The liquid crystal display device of the present invention includes no electrode on the upper glass substrate 21 which serves as a support, but includes components such as a color filter layer appropriately disposed on the glass substrate (the display device may include a black matrix on the same layer).

FIG. 2 includes enlarged views of a portion indicated by dashed lines in FIG. 1, illustrating a long-term change of the portion. FIG. 3 includes views of a portion of a liquid crystal display device in which a low-molecular-weight compound is added to an alignment film material, illustrating a long-term change of the portion.

In the case of the present invention, as illustrated in FIG. 2, a nitrogen radical (e.g., a side chain containing a benzotriazole group) is chemically bonded to the polymer main chain in the alignment film 13. As a result, the states of the alignment film 13 and the liquid crystal layer 31 show no change even for a long time.

In contrast, Patent Literature 2 does not disclose that a low-molecular-weight organic compound containing a radical as disclosed in Patent Literature 2 (e.g., a low-molecular-weight compound containing a benzotriazole group) is added to an alignment film material. Still, even if such a compound is added to the alignment film material, long lapse of time may possibly cause defects such as coagulation of the low-molecular-weight compound, uneven distribution of the low-molecular-weight compound on the surface of the alignment film 113, and dissolution of the low-molecular-weight compound in the liquid crystal layer 131 (for example, see FIG. 3).

In the present embodiment, a photo-aligning polymer is used in which a hydrazyl radical is introduced into a side chain of the polymer by chemical bonding. This is described in detail below.

In order to allow the photo-functional group in the photo-alignment film to scavenge radicals generated by absorption of backlight illumination, a functional group containing a hydrazyl radical with very high radical-scavenging capacity is introduced into a polymer constituting the photo-alignment film by chemical bonding. Since the hydrazyl radical has a very high capacity to scavenge other radicals, the amount of a monomer unit that has a side chain containing a hydrazyl radical to be introduced may have only to fall within the range of, for example, 0.01 to 1 mol % relative to 100 mol % of the monomer units of the whole polymer. In general, use of a copolymer of a monomer unit containing a photo-functional group and a monomer unit having a different function as a photo-aligning polymer leads to a reduction in the amount of a photo-functional group to be introduced. Still, if the amount of a side chain having a different function (radical-scavenging function) to be introduced is significantly small as in the present case, such a side chain having a radical-scavenging function can be introduced substantially without reducing the amount of the photo-aligning functional group to be introduced.

The polymers (polyamic acid and polyimide structures) each constituting a photo-alignment film having a radical-scavenging function owing to a hydrazyl radical may be respectively represented by the following formula (1) and formula (2), for example.

[Chem. 1]

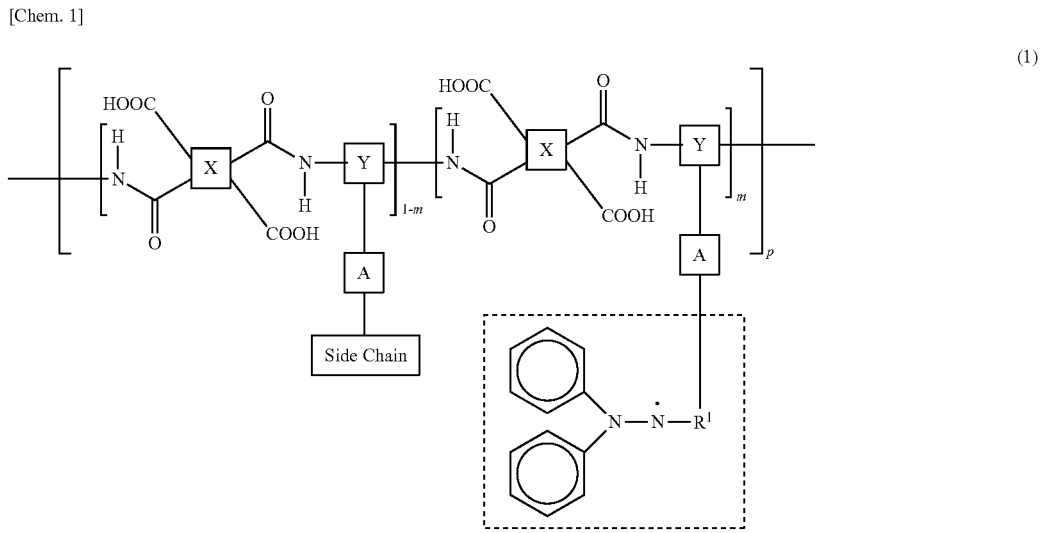

(1)

[Chem. 2]

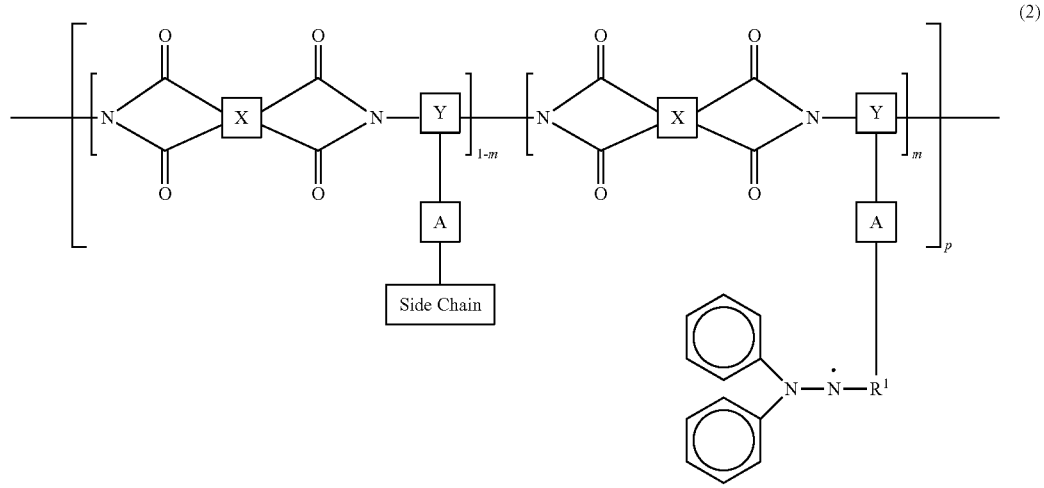

(2)

In each of the formula (1) and the formula (2), p represents the degree of polymerization, and is an integer of 1 or greater, preferably 10 or greater; m represents the amount of a monomer unit containing a hydrazyl radical to be introduced, and is greater than 0 and not greater than 0.01, preferably 0.001 to 0.01, more preferably 0.001 to 0.005. The hydrazyl radical has a very high radical-scavenging capacity, and thus can provide a sufficient radical-scavenging effect even when m is as small as mentioned above. $R^1$ is a direct bond or a divalent organic group. A is defined in the same manner as $R^1$.

In each of the formula (1) and the formula (2), Side Chain may be a photo-aligning functional group, a vertically or horizontally aligning functional group, or a combination thereof. The combination thereof herein means that two or more of these functional groups can be present in a single polymer. The portion indicated by dashed lines is a functional group containing a hydrazyl radical.

In each of the formula (1) and the formula (2), Xs each may be a tetravalent group represented by any of the following formulas (3-1) to (3-12). These groups can be used for both a horizontal alignment film and a vertical alignment film.

[Chem. 3]

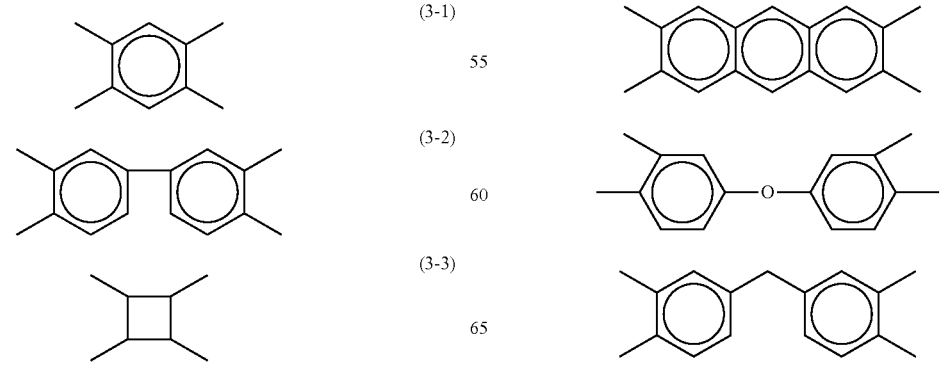

-continued (3-12)
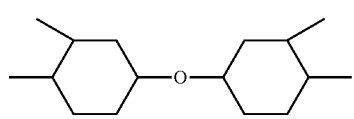

In each of the formula (1) and the formula (2), Xs each may be a tetravalent group represented by any of the following formulas (4-1) to (4-4). These groups can be used for both a horizontal photo-alignment film and a vertical photo-alignment film.

[Chem. 4]

(4-1)
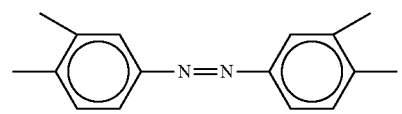

(4-2)
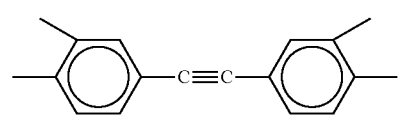

(4-3)
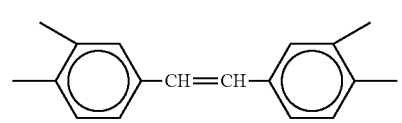

(4-4)
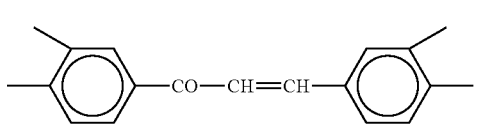

In each of the formula (1) and the formula (2), Ys each may be a trivalent group represented by any of the following formulas (5-1) to (5-16). These groups can be used for both a horizontal alignment film and a vertical alignment film.

[Chem. 5]

(5-1)
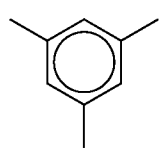

(5-2)
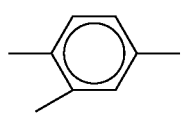

(5-3)
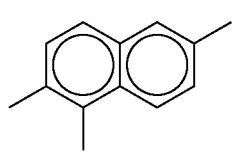

(5-4)
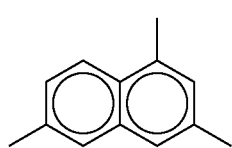

(5-5)
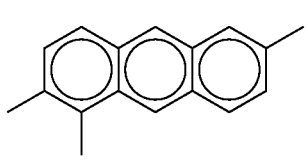

(5-6)
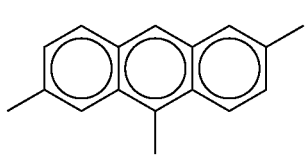

(5-7)
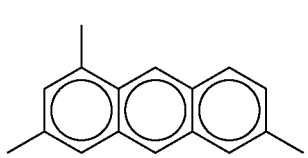

(5-8)
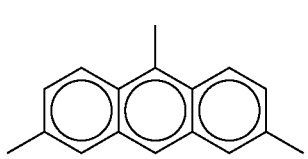

(5-9)
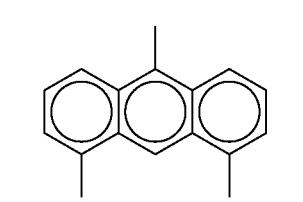

(5-10)
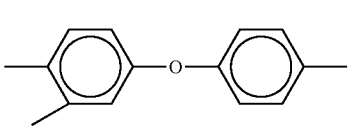

(5-11)
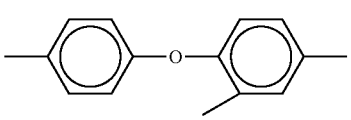

(5-12)
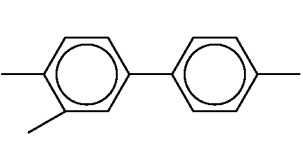

(5-13)
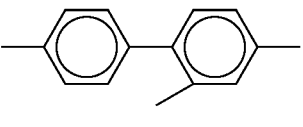

(5-14)
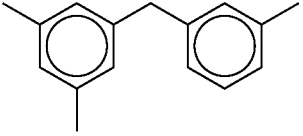

(5-15)
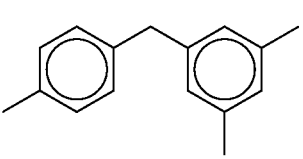

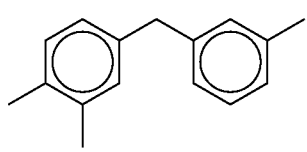
(5-16)

In each of the formula (1) and the formula (2), Ys each may be a trivalent group represented by any of the following formulas (6-1) to (6-8). These groups can be used for any of a horizontal alignment film, a vertical alignment film, a horizontal photo-alignment film, and a vertical photo-alignment film.

[Chem. 6]

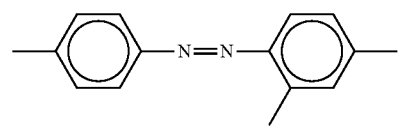
(6-1)

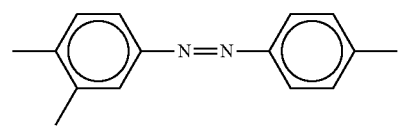
(6-2)

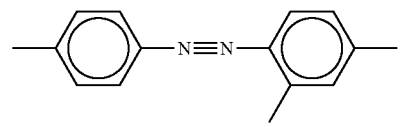
(6-3)

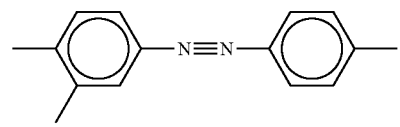
(6-4)

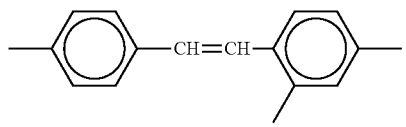
(6-5)

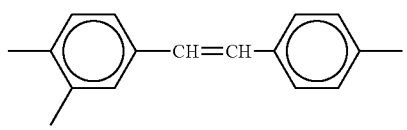
(6-6)

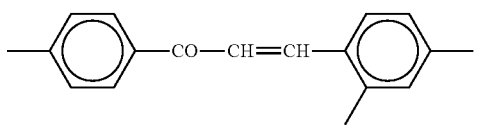
(6-7)

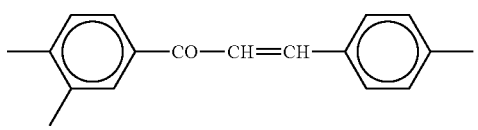
(6-8)

In each of the formula (1) and the formula (2), at least part of Side Chains is preferably a photo-aligning functional group, and a vertically or horizontally aligning functional group may separately be introduced thereinto. Side Chains each may be a monovalent group represented by any of the following formulas (7-1) to (7-8). These groups are used for a horizontal alignment film.

[Chem. 7]

(7-1)

(7-2)

(7-3)

(7-4)

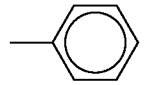
(7-5)

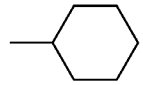
(7-6)

(7-7)

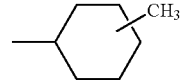
(7-8)

In each of the formula (1) and the formula (2), Side Chains each may be a monovalent group represented by any of the following formulas (8-1) to (8-7). These groups are used for a vertical alignment film.

[Chem. 8]

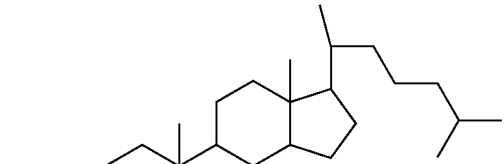
(8-1)

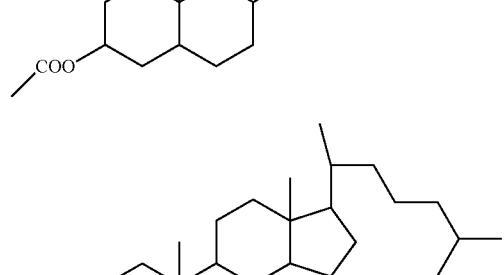
(8-2)

(8-3)

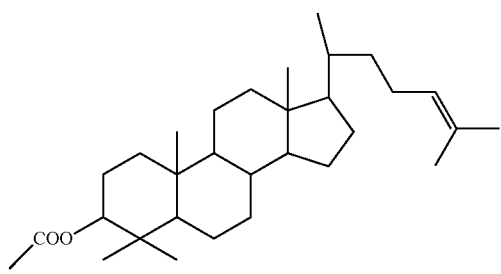

(8-4)

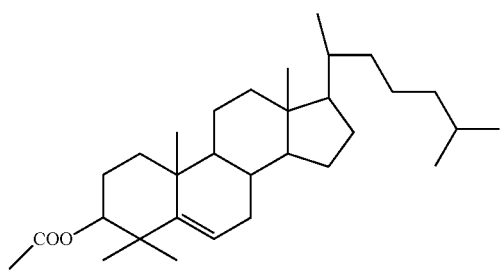

(8-5)

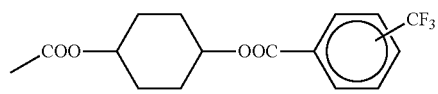

(8-6)

(8-7)

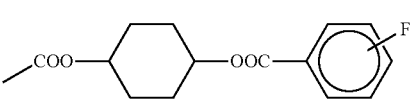

In each of the formula (1) and the formula (2), Side Chains each may be a monovalent group represented by the following formula (9-1) or (9-2). These groups are used for a horizontal photo-alignment film.

[Chem. 9]

(9-1)

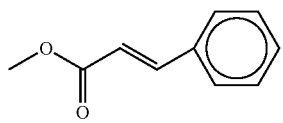

(9-2)

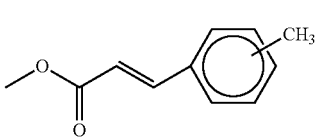

In each of the formula (1) and the formula (2), Side Chains each may be a monovalent group represented by the following formulas (10-1) to (10-21). These groups are used for a vertical photo-alignment film.

[Chem. 10-1]

(10-1)

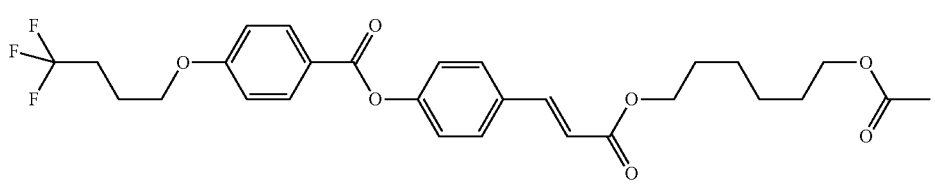

(10-2)

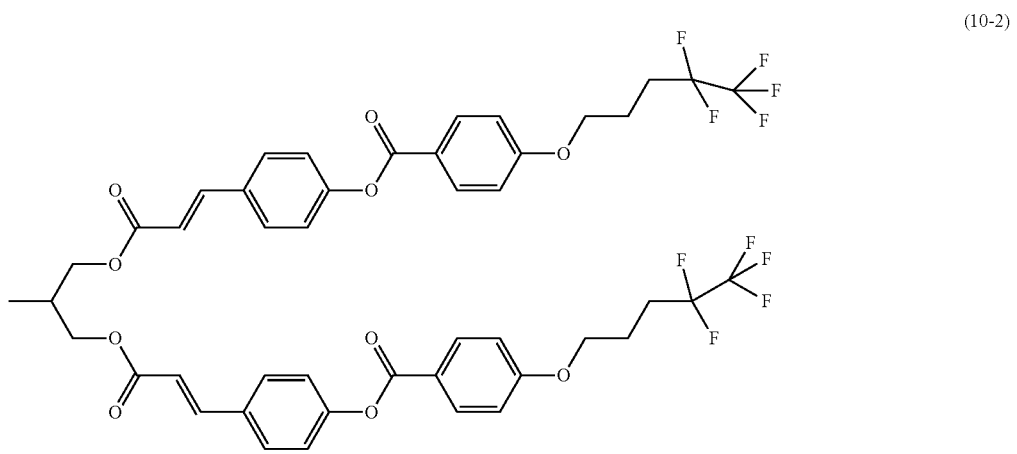

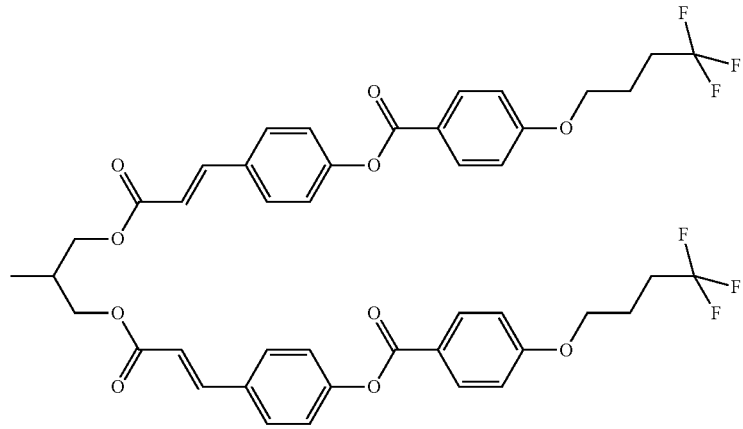
(10-3)
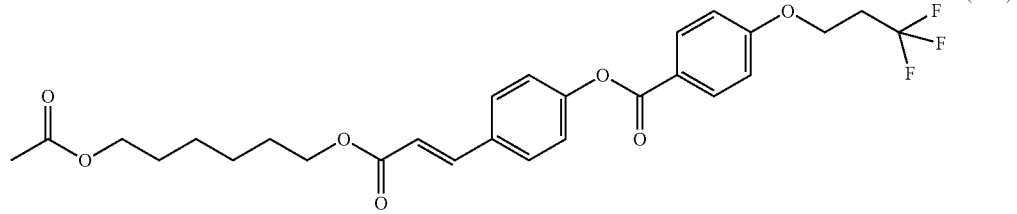
(10-4)
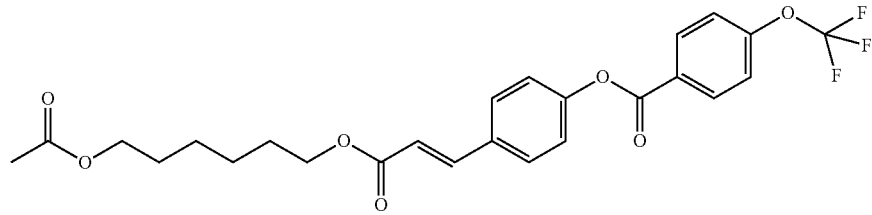
(10-5)
[Chem. 10-2]
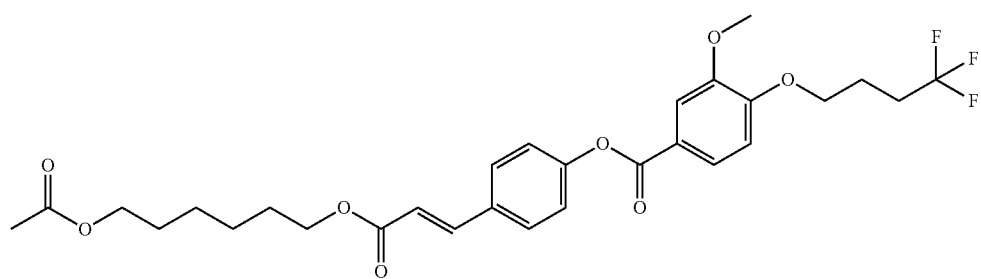
(10-6)
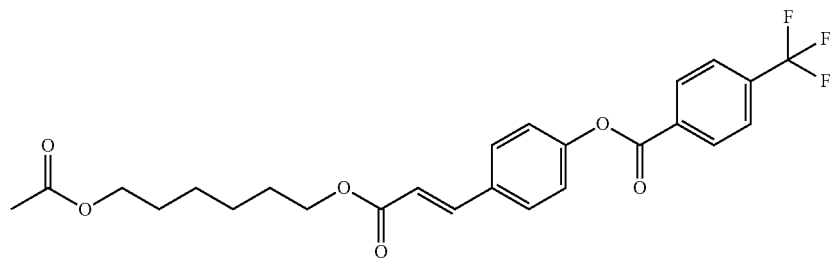
(10-7)

(10-8)
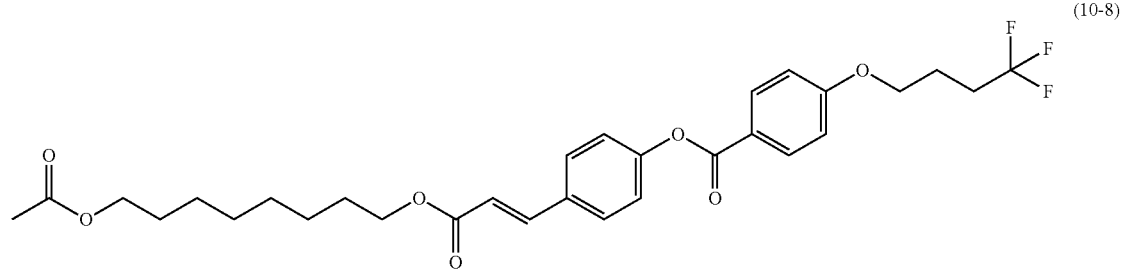
(10-9)
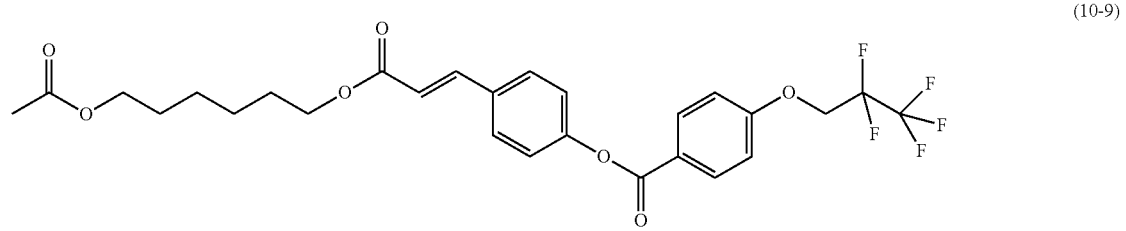
(10-10)
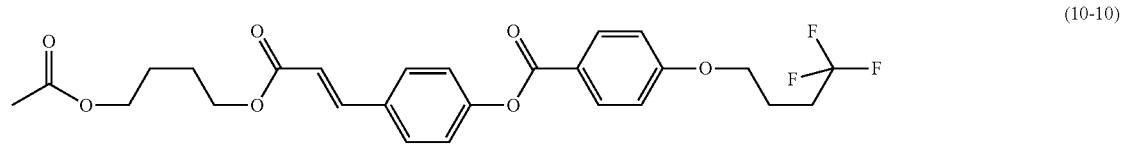
(10-11)
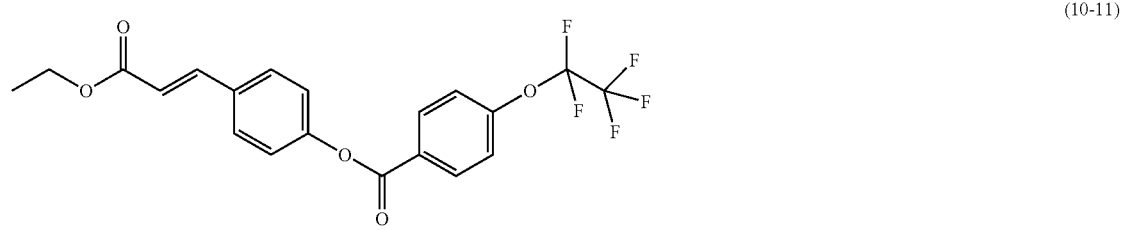
[Chem. 10-3]
(10-12)
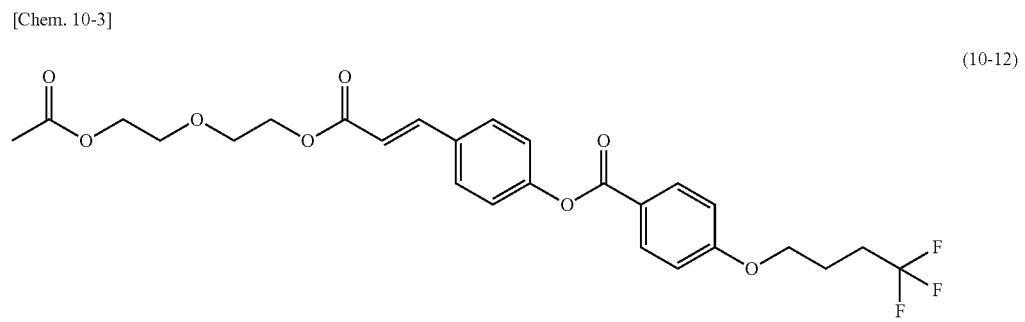
(10-13)
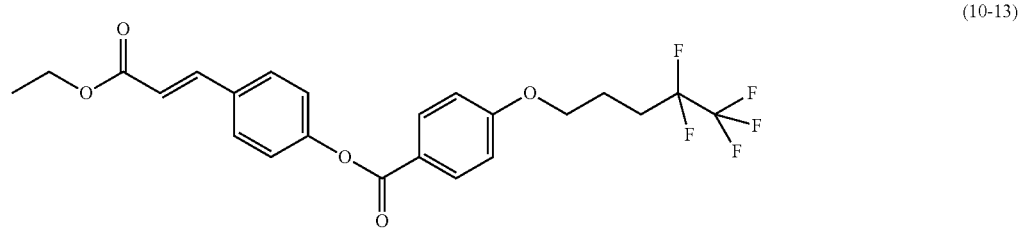
(10-14)
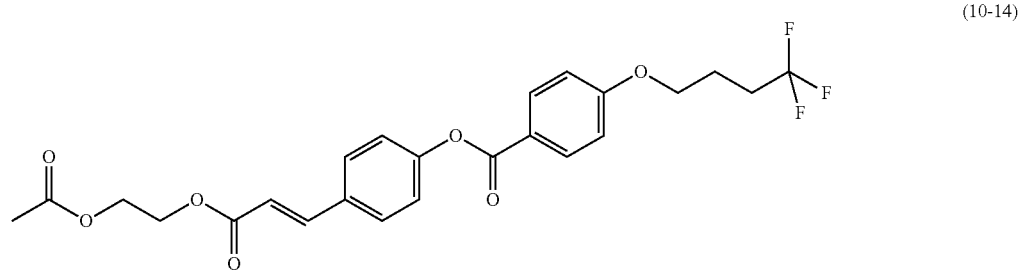

-continued
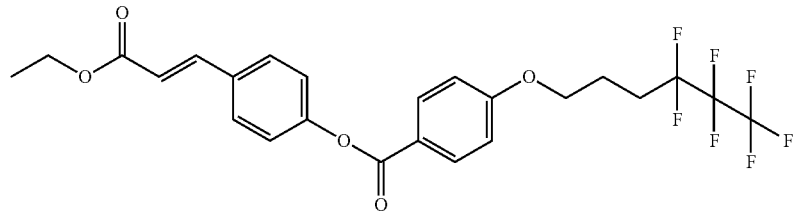
(10-15)
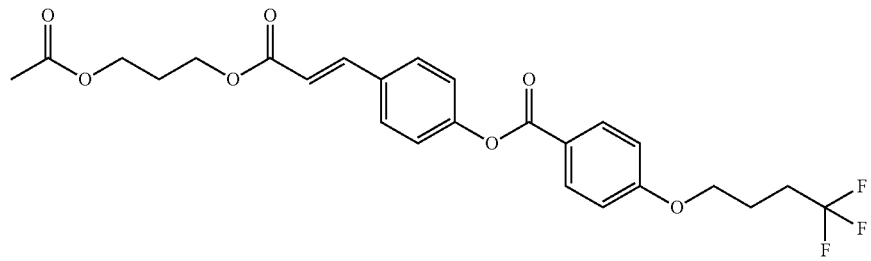
(10-16)
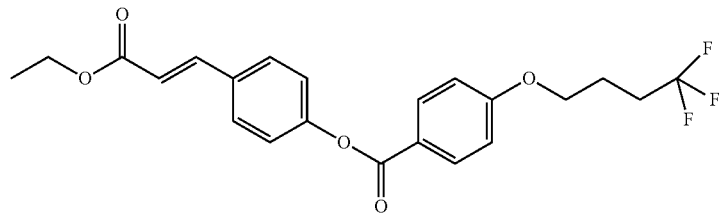
(10-17)
[Chem. 10-4]
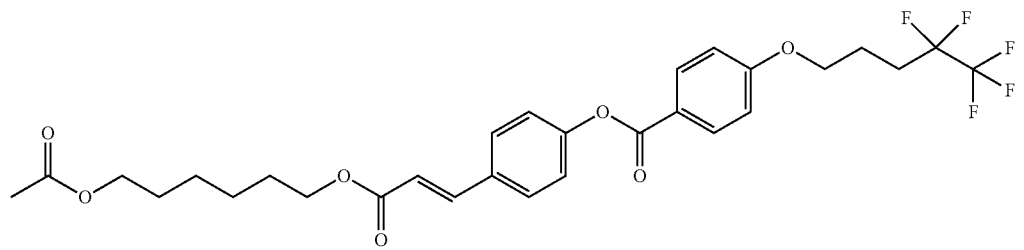
(10-18)
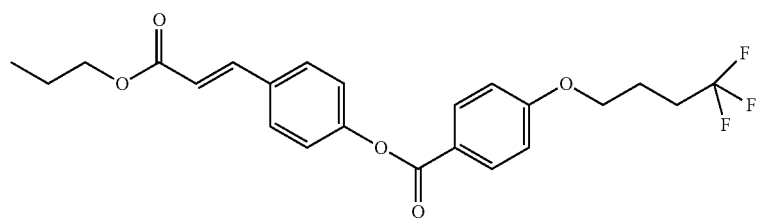
(10-19)
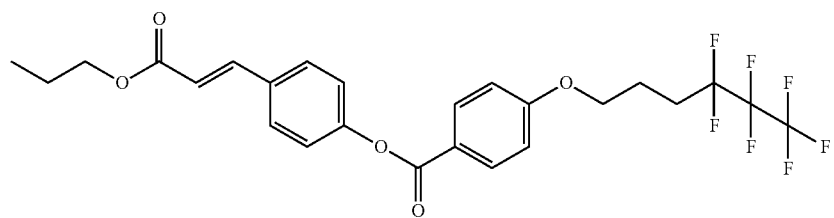
(10-20)

(10-21)

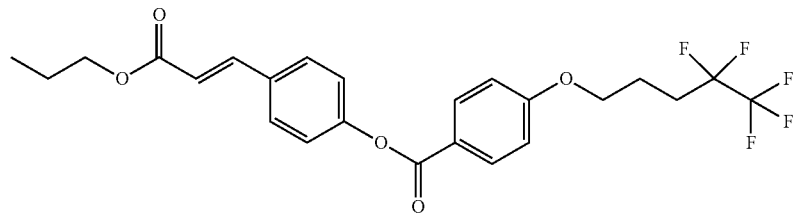

The polymers (polysiloxane and polyvinyl) each constituting the (photo-)alignment film having a radical-scavenging function owing to a hydrazyl radical may be respectively as represented by the following formula (11) and the following formula (12), for example.

[Chem. 11]

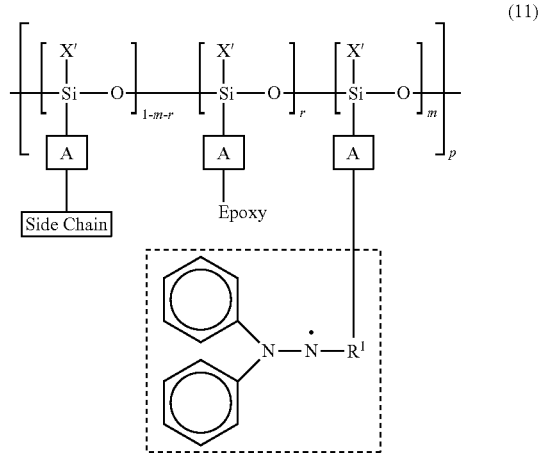

(11)

[Chem. 12]

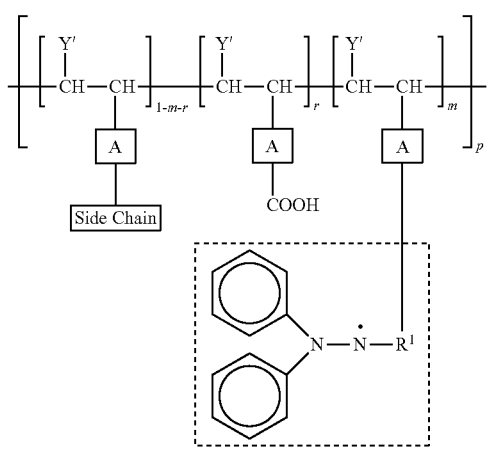

(12)

In each of the formula (11) and the formula (12), p represents the degree of polymerization, and is an integer of 1 or greater, preferably 10 or greater; m represents the amount of a monomer unit containing a hydrazyl radical to be introduced, and is greater than 0 and not greater than 0.01, and m+r<1. The hydrazyl radical has a very high radical-scavenging capacity, and thus can provide a sufficient radical-scavenging effect even when m is as small as mentioned above. $R^1$ is a direct bond or a divalent organic group. A is defined in the same manner as $R^1$.

In each of the formula (11) and the formula (12), Side Chain may be any of the aforementioned ones, and may be a photo-aligning functional group, a vertically or horizontally aligning functional group, or a combination thereof. The combination thereof herein means that two or more of these functional groups can be present in a single polymer. The portion indicated by dashed lines is a functional group containing a hydrazyl radical. The portion indicated by a rectangle indicates a divalent linking group.

In the formula (11), Epoxy represents a functional group containing an epoxy group. X' is a hydrogen atom or a substituent, preferably a hydrogen atom, a hydroxy group, a methoxy group, or an ethoxy group.

In the formula (12), Y' is a hydrogen atom or a substituent, preferably a hydrogen atom, a methyl group, or an ethyl group.

More specific examples of the structure of the polymer having a main chain derived from a polysiloxane include those represented by the following formula (13) or formula (14).

[Chem. 13]

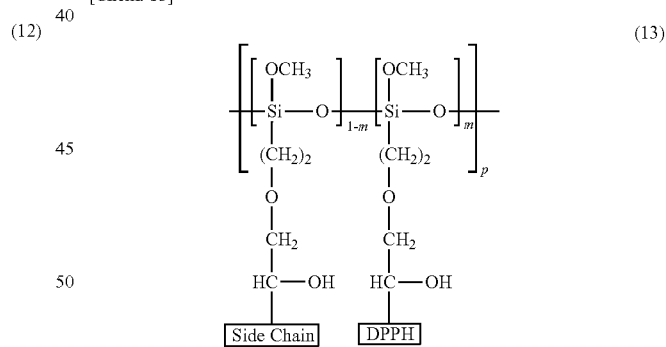

(13)

[Chem. 14]

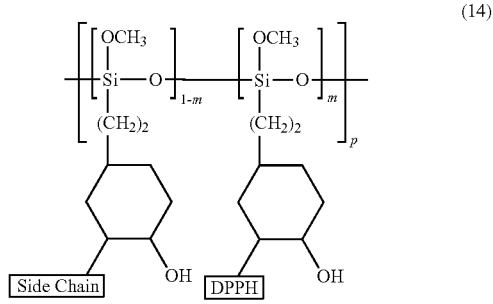

(14)

In each of the formula (13) and the formula (14), Side Chain may be any of the aforementioned ones, and is preferably a monovalent group represented by the following formula (15-1) or (15-2).

[Chem. 15]

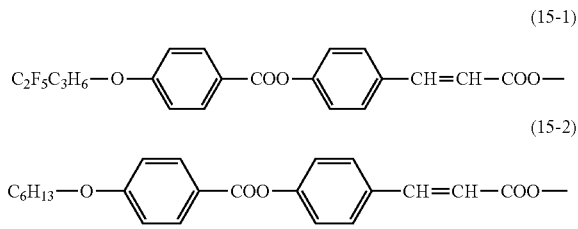

(15-1)

(15-2)

In each of the formula (13) and the formula (14), the functional group containing a hydrazyl radical (DPPH) is preferably a monovalent group represented by the following formula (16-1) or (16-2).

[Chem. 16]

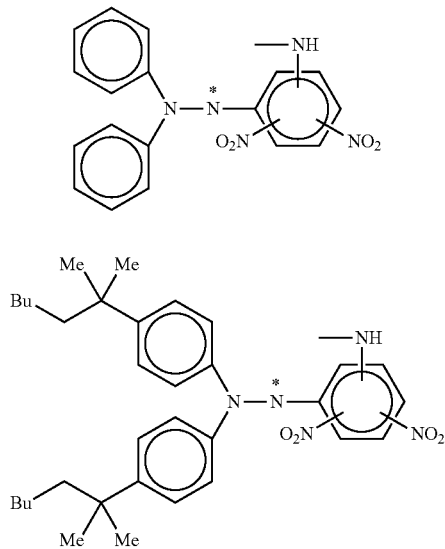

(16-1)

(16-2)

Example of Synthesis of Diamine Monomer Containing Hydrazyl Radical

One example of synthesis of a diamine monomer containing a hydrazyl radical in a side chain is shown below.

First, 3 g of dinitrophenyl acetate (13.3 mmol, compound (a)) was dissolved in 8 mL of Solmix AP-I, and 0.06 g of Raney Ni was added thereto. The mixture was then put into an autoclave. The system was purged with hydrogen and left to stand at room temperature and 0.4 MPa overnight. Termination of the reaction was checked by HPLC, and the reaction liquid was filtered through cerite. The filtrate was concentrated until distillate was not observed any longer. The resulting crude liquid was distilled under reduced pressure, so that 1.98 g (11.9 mmol) (yield: 90%) of 2,4-diaminophenyl acetate (b) was obtained.

Next, 1.8 g (10.8 mmol) of the compound (b) was dissolved in 5 mL of acetone, and a t-butoxycarbonyl anhydride (5 g/5 mL THF) was dropwise added thereto. After the dropwise addition, the temperature of the mixture was increased up to the reflux temperature and the mixture was left to stand overnight. After the reaction termination, the reaction liquid was concentrated and the resulting product was dried. Thereby, a Boc-attached compound (c) (3.73 g, 10.2 mmol, yield: 94%) was obtained.

[Chem. 17]

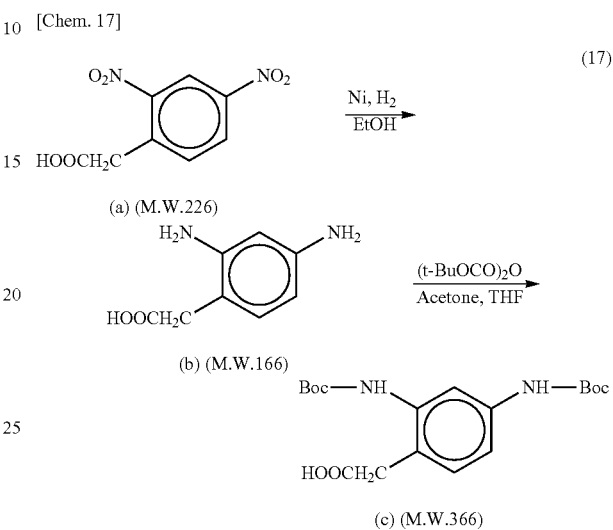

(17)

(a) (M.W.226)

(b) (M.W.166)

(c) (M.W.366)

Next, thionyl chloride was dropwise added to a benzene solution (30 mL) containing 3.5 g (9.56 mmol) of the compound represented by the formula (c), so that an acid chloride compound (3.42 g, 8.89 mmol, yield: 93%) was synthesized. Then, a benzene solution (20 mL) containing 3.3 g (8.5 mmol) of the acid chloride compound represented by the following formula (d) was dropwise added to a benzene solution (30 mL) containing 3.64 g (10 mmol) of a hydrazyl radical-containing compound (e) represented by the formula (e) and 1.5 g (15 mmol) of triethylamine at room temperature in a nitrogen atmosphere. The components were then reacted for two hours at room temperature. After the reaction termination, impurities were extracted with water and the resulting product was purified by column chromatography (toluene/ethyl acetate (4/1)). Thereby, 4.89 g (yield: 80%) of the target compound represented by the following formula (f) was obtained.

[Chem. 18]

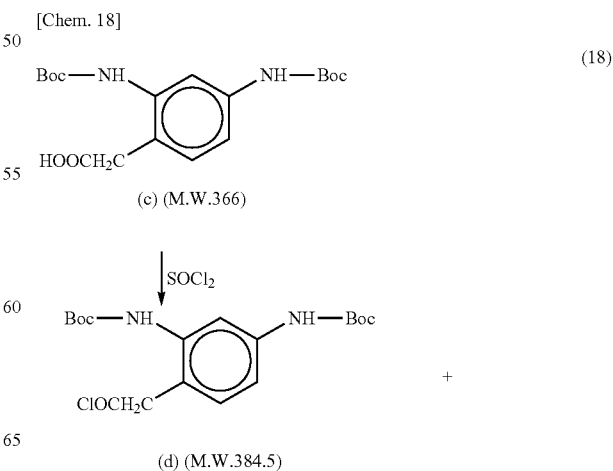

(18)

(c) (M.W.366)

(d) (M.W.384.5)

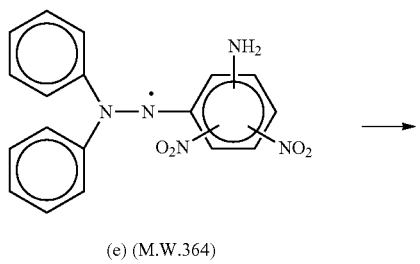

(e) (M.W.364)

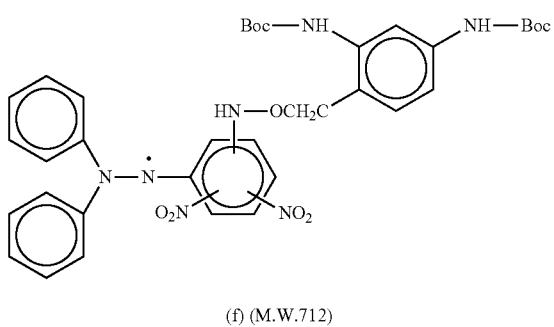

(f) (M.W.712)

The compound (f) was dissolved in methylene chloride, and tin(II) trifluoromethanesulfonate (Sn(OTf)$_2$) was added in portions at 0° C. The reaction was allowed to proceed at room temperature, and 5% NaHCO$_3$aq was added thereto so that the mixture was neutralized. Then, the reaction product was washed with water until the pH became neutral. The organic layer was dried over anhydrous magnesium sulfate, and the resulting deposit was filtered out through cerite. The filtrate was concentrated, so that a diamine monomer (g) was obtained.

[Chem. 19]

(19)

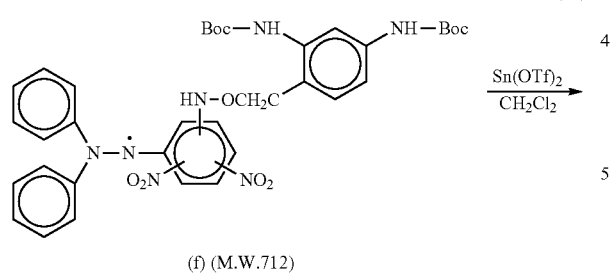

(f) (M.W.712)

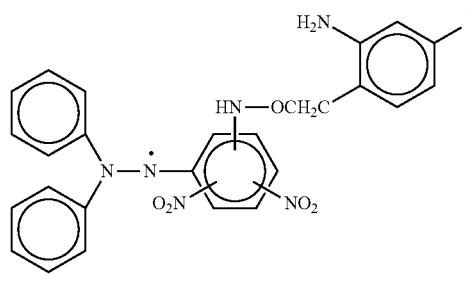

(g) (M.W.512)

(Condensation Polymerization 1)

Example of Synthesis in which 0.5 Mol % of Hydrazyl Radical-Containing Monomer Having Radical-Scavenging Function is Introduced An acid anhydride (0.10 mol) represented by the following formula (20) was added to a γ-butyrolactone solution containing a photo-functional group-containing diamine (0.0995 mol) represented by the following formula (21) and a hydrazyl radical-containing diamine (0.0005 mol) represented by the following formula (22). They were reacted at 60° C. for 12 hours, so that a polyamic acid with a random structure was obtained.

In order to imidize the resulting polyamic acid, the following treatment was performed.

A γ-butyrolactone solution of the resulting polyamic acid was mixed with an excessive amount of pyridine (0.5 mol) and acetic anhydride (0.3 mol), and they were reacted at 150° C. for three hours.

The resulting polyimide had a weight average molecular weight of 70,000 and a molecular weight distribution of 2.1. The imidization rate was 50%.

Thereby, a polyamic acid and a polyimide each containing a photo-functional group and a hydrazyl radical were obtained.

[Chem. 20]

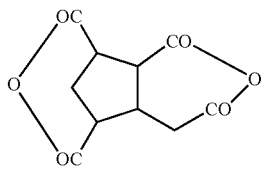

(20)

[Chem. 21]

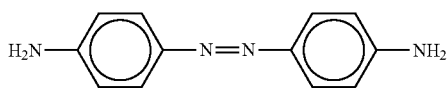

(21)

[Chem. 22]

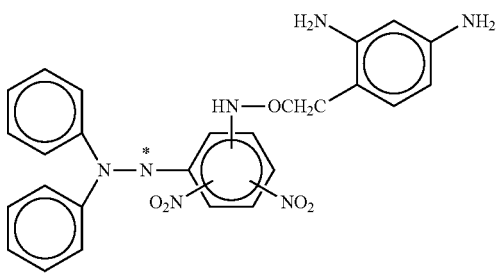

(22)

(Condensation Polymerization 2)

Example of Synthesis in which 0.5 Mol % of Hydrazyl Radical-Containing Monomer Having Radical-Scavenging Function is Introduced An acid anhydride (0.10 mol) represented by the formula (20) was added to a γ-butyrolactone solution containing a vertically aligning photo-functional group-containing diamine (0.0995 mol) represented by the following formula (23) and a hydrazyl radical-containing diamine (0.0005 mol) represented by the formula (22). They were reacted at 60° C. for 12 hours, so that a polyamic acid with a random structure was obtained.

In order to imidize the resulting polyamic acid, the following treatment was performed.

A γ-butyrolactone solution of the resulting polyamic acid was mixed with an excessive amount of pyridine (0.5 mol) and acetic anhydride (0.3 mol), and they were reacted at 150° C. for three hours.

The resulting polyimide had a weight average molecular weight of 70,000 and a molecular weight distribution of 2.4. The imidization rate was 50%.

Thereby, a polyamic acid and a polyimide each containing a photo-functional group and a hydrazyl radical were obtained.

[Chem. 23]

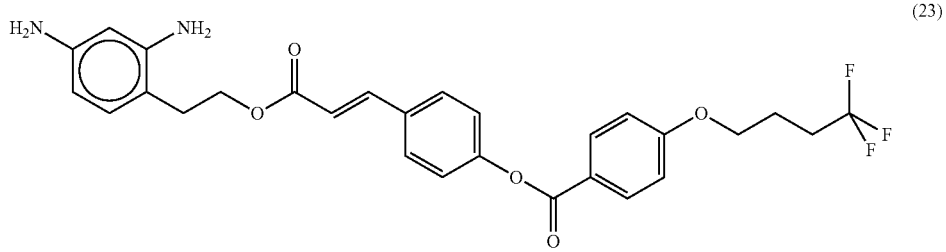

(23)

Examples 1-1 to 1-4 and Comparative Examples 1-1 and 1-2: Horizontal Photo-Alignment IPS Using the same materials as in Condensation Polymerization 1, the following alignment film materials were synthesized with the following amounts m of a hydrazyl radical-containing monomer unit to be introduced:

(1) an alignment film material formed from a polyamic acid with m=0 (Comparative Example 1-1);

(2) an alignment film material formed from a polyamic acid with m=0.001 (Example 1-1);

(3) an alignment film material formed from a polyamic acid with m=0.005 (Example 1-2);

(4) an alignment film material formed from a polyamic acid with m=0.01 (Example 1-3);

(5) an alignment film material formed from a polyamic acid with m=0.5 (Example 1-4); and (6) an alignment film material formed from a polyamic acid with m=0 and a hydrazyl radical-containing low-molecular-weight additive in an amount of 0.1 wt % relative to the polyamic acid (Comparative Example 1-2).

(Production of Liquid Crystal Cell)

A TFT substrate including comb-shaped electrodes formed from indium tin oxide (ITO) and a counter substrate without an electrode were prepared. The corresponding alignment film material containing a polyamic acid was applied to the substrates, and the workpiece was pre-baked at 90° C. for five minutes and baked at 200° C. for 40 minutes. Thereby, photo-alignment films were obtained which have the same chemical structure (containing an azobenzene group) as the polymer obtained in Condensation Polymerization 1. Then, the surfaces of the substrates each provided with an alignment film were irradiated with 1 J/cm² of linearly polarized ultraviolet light with a center wavelength of 365 nm, so that alignment treatment was performed. On one substrate, an ultraviolet-curable sealant (trade name: Photolec S-WB, Sekisui Chemical Co., Ltd.) was applied in a predetermined pattern using a dispenser. At a predetermined position on the other substrate, a positive liquid crystal composition was dropped. The substrates were attached to each other in a vacuum and the sealant was cured by ultraviolet light. The workpiece was heated at 130° C. for 40 minutes and subjected to re-alignment treatment so that the liquid crystal was converted into an isotropic phase. Then, the workpiece was cooled down to room temperature, and thereby an IPS-mode liquid crystal cell was obtained.

(High-Temperature Test on Backlight)

In order to evaluate the heat resistance of the liquid crystal cell, the liquid crystal cell was left to stand for 5000 hours on a 75° C. backlight, and the voltage holding ratio (VHR) and the contrast were determined before and after the test. The VHR was determined at 1 V and 70° C. using a VHR measurement system Model 6254 (Toyo Corp.). The contrast was determined at 25° C. using Topcon UL-1. The results are shown in Table 1.

TABLE 1

|  | Before test | | After 5000-hour test | |
| --- | --- | --- | --- | --- |
|  | VHR (%) | Contrast | VHR (%) | Contrast |
| m = 0 (Comparative Example 1-1) | 99.5 | 1400 | 91.6 | 1100 |
| m = 0.001 (Example 1-1) | 99.5 | 1400 | 99.3 | 1350 |
| m = 0.005 (Example 1-2) | 99.5 | 1400 | 99.5 | 1400 |
| m = 0.01 (Example 1-3) | 99.5 | 1400 | 99.5 | 1400 |
| m = 0.5 (Example 1-4) | 96.1 | 1350 | 95.5 | 1200 |
| m = 0 low-molecular-weight additive 0.1 wt % (Comparative Example 1-2) | 97.5 | 1250 | 92.5 | 1050 |

For the alignment film materials obtained using the same materials as in Condensation Polymerization 1, the alignment film material with m=0 (Comparative Example 1-1) showed a great reduction in both VHR and contrast after the 5000-hour test on a 75° C. backlight. The reduction in VHR and the reduction in contrast due to the VHR reduction may possibly be caused by generation of radicals from the photo-functional groups (azobenzene) in the photo-alignment film by the influence of backlight illumination, and the subsequent dissolution of these radicals in the liquid crystal layer and ionization thereof. As the value of m increased, the reduction in VHR became small and the reduction in contrast also became small after the 5000-hour test. This is presumably because the radicals generated from the photo-functional groups were effectively scavenged by the hydrazyl radicals, so that the dissolution of the radicals in the liquid crystal layer and the ionization thereof were reduced. In contrast, when m was increased to 0.5, the VHR value was low at the beginning even though the hydrazyl radical-containing monomer unit was bonded to the alignment film polymer. This is presumably because radicals were slightly charged, and thus highly stable radicals, such as hydrazyl radicals, may possibly cause a low VHR at the beginning.

The alignment film material with m=0 and containing 0.1 wt % of a low-molecular-weight additive (Comparative Example 1-2) showed a low VHR and a low contrast at the beginning, and caused reduction in VHR and contrast after the 5000-hour test. Such a low VHR and contrast at the beginning may possibly be caused by slight dissolution of the low-molecular-weight additive in the liquid crystal layer at the beginning, as well as uneven dispersion of the low-molecular-weight additive on the film surface, which may impair the liquid crystal alignment. Further, the 5000-hour test seems to cause additional dissolution of the additive, which may possibly cause the reduction in VHR and the reduction in contrast due to the VHR reduction.

Examples 2-1 to 2-4 and Comparative Example 2: Horizontal Photo-Alignment FFS Using the same materials as in Condensation Polymerization 1, the following alignment film materials were synthesized with the following amounts m of a hydrazyl radical-containing monomer unit to be introduced:

(1) an alignment film material formed from a polyamic acid with m=0 (Comparative Example 2);

(2) an alignment film material formed from a polyamic acid with m=0.001 (Example 2-1);

(3) an alignment film material formed from a polyamic acid with m=0.005 (Example 2-2);

(4) an alignment film material formed from a polyamic acid with m=0.01 (Example 2-3); and (5) an alignment film material formed from a polyamic acid with m=0.5 (Example 2-4).

(Production of Liquid Crystal Cell)

A TFT substrate including FFS-mode ITO electrodes and a counter substrate without an electrode were prepared. The corresponding alignment film material containing a polyamic acid was applied to the substrates, and the workpiece was pre-baked at 90° C. for five minutes and baked at 200° C. for 40 minutes. Thereby, photo-alignment films were obtained which have the same chemical structure (containing an azobenzene group) as the polymer obtained in Condensation Polymerization 1. Then, the surfaces of the pair of the alignment film substrates were irradiated with 1 J/cm$^2$ of linearly polarized ultraviolet light with a center wavelength of 365 nm, so that alignment treatment was performed. On one substrate, an ultraviolet-curable sealant (trade name: Photolec S-WB, Sekisui Chemical Co., Ltd.) was applied in a predetermined pattern using a dispenser. At a predetermined position on the other substrate, a negative liquid crystal composition was dropped. The substrates were attached to each other in a vacuum and the sealant was cured by ultraviolet light. The workpiece was heated at 130° C. for 40 minutes and subjected to re-alignment treatment so that the liquid crystal was converted into an isotropic phase. Then, the workpiece was cooled down to room temperature, and thereby an FFS-mode liquid crystal cell was obtained.

(High-Temperature Test on Backlight)

The same test as in Example 1 was performed. The results are shown in Table 2.

TABLE 2

|  | Before test | | After 5000-hour test | |
|---|---|---|---|---|
|  | VHR (%) | Contrast | VHR (%) | Contrast |
| m = 0 (Comparative Example 2) | 99.5 | 1500 | 74.5 | 900 |
| m = 0.001 (Example 2-1) | 99.5 | 1500 | 93.5 | 1400 |
| m = 0.005 (Example 2-2) | 99.5 | 1500 | 96.5 | 1450 |
| m = 0.01 (Example 2-3) | 99.5 | 1500 | 97.0 | 1450 |
| m = 0.5 (Example 2-4) | 94.2 | 1500 | 89.3 | 1200 |

For the alignment film materials obtained using the same materials as in Condensation Polymerization 1, the alignment film material with m=0 (Comparative Example 2) showed a greater reduction in both VHR and contrast after the 5000-hour test on a 75° C. backlight than in the case of the IPS-mode cell formed from a positive liquid crystal material. The reduction in VHR and the reduction in contrast due to the VHR reduction may possibly be caused by generation of radicals from the photo-functional groups (azobenzene) in the photo-alignment film by the influence of backlight illumination, and the subsequent dissolution of these radicals in the liquid crystal layer and ionization thereof. As the value of m increased, the reduction in VHR became significantly small and the reduction in contrast also became small after the 5000-hour test. This is presumably because the radicals generated from the photo-functional groups were effectively scavenged by the hydrazyl radicals, so that the dissolution of the radicals in the liquid crystal layer and the ionization thereof were reduced. In contrast, when the amount m of the hydrazyl radical-containing monomer unit to be introduced was increased to 0.5, the VHR value was low at the beginning even though the hydrazyl radical-containing monomer unit was bonded to the alignment film polymer. This is presumably because radicals were slightly charged, and thus highly stable radicals, such as hydrazyl radicals, may possibly cause a low VHR at the beginning.

Examples 3-1 to 3-4 and Comparative Example 3: Vertical Photo-Alignment

Using the same materials as in Condensation Polymerization 2, the following alignment film materials were synthesized with the following amounts m of a hydrazyl radical-containing monomer unit to be introduced:

(1) an alignment film material formed from a polyamic acid with m=0 (Comparative Example 3);

(2) an alignment film material formed from a polyamic acid with m=0.001 (Example 3-1);

(3) an alignment film material formed from a polyamic acid with m=0.005 (Example 3-2);

(4) an alignment film material formed from a polyamic acid with m=0.01 (Example 3-3); and (5) an alignment film material formed from a polyamic acid with m=0.5 (Example 3-4).

(Production of Liquid Crystal Cell)

A TFT substrate including a vertical photo-alignment-mode ITO electrode and a counter substrate were prepared. The corresponding alignment film material containing a polyamic acid was applied to the substrates, and the workpiece was pre-baked at 90° C. for five minutes and baked at 200° C. for 40 minutes. Thereby, vertical photo-alignment films were obtained which have the same chemical structure (containing a cinnamate group) as the polymer obtained in Condensation Polymerization 2. Then, the surfaces of the pair of the alignment film substrates were irradiated with 20 mJ/cm$^2$ of linearly polarized ultraviolet light with a center wavelength of 330 nm, so that alignment treatment was performed. On one substrate, an ultraviolet-curable sealant (trade name: Photolec S-WB, Sekisui Chemical Co., Ltd.) was applied in a predetermined pattern using a dispenser. At a predetermined position on the other substrate, a negative liquid crystal composition was dropped. The substrates were attached to each other in a vacuum and the sealant was cured by ultraviolet light. The workpiece was heated at 130° C. for 40 minutes and subjected to re-alignment treatment so that the liquid crystal was converted into an isotropic phase. Then, the workpiece was cooled down to room temperature, and thereby an ultraviolet induced multi-domain vertical alignment (UV2A) mode liquid crystal cell was obtained.

(High-Temperature Test on Backlight)

The same test as in Example 1 was performed. The results are shown in Table 3.

TABLE 3

| | Before test | | After 5000-hour test | |
|---|---|---|---|---|
| | VHP (%) | Contrast | VHR (%) | Contrast |
| m = 0 (Comparative Example 3) | 99.5 | 3000 | 94.5 | 2700 |
| m = 0.001 (Example 3-1) | 99.5 | 3000 | 97.5 | 3000 |
| m = 0.005 (Example 3-2) | 99.5 | 3000 | 99.0 | 3000 |
| m = 0.01 (Example 3-3) | 99.5 | 3000 | 99.0 | 3000 |
| m = 0.5 (Example 3-4) | 95.1 | 2900 | 92.0 | 2850 |

For the alignment film materials obtained using the same materials as in Condensation Polymerization 1, the alignment film material with m=0 (comparative example 3) showed a reduction in both VHR and contrast after the 5000-hour test on a 75° C. backlight. The reduction in VHR and the reduction in contrast due to the VHR reduction may possibly be caused by slight generation of radicals from the photo-functional groups (cinnamate groups) in the photo-alignment film by the influence of backlight illumination, and the subsequent dissolution of these radicals in the liquid crystal layer and ionization thereof. As the value of m increased, the reduction in VHR almost disappeared and the reduction in contrast also disappeared after the 5000-hour test. This is presumably because the radicals generated from the photo-functional groups were effectively scavenged by the hydrazyl radicals, so that the dissolution of the radicals in the liquid crystal layer and the ionization thereof were reduced. In contrast, when the amount m of the hydrazyl radical-containing monomer unit to be introduced was increased to 0.5, the VHR value and the contrast were low at the beginning even though the hydrazyl radical-containing monomer unit was bonded to the alignment film polymer. This is presumably because radicals were slightly charged, and thus highly stable radicals, such as hydrazyl radicals, may possibly cause a low VHR and a low contrast at the beginning.

Examples 4-1 to 4-4 and Comparative Example 4: Vertical Photo-Alignment

Using a polymer represented by the formula (14) and containing the group represented by the formula (15-1) and the group represented by the formula (15-2) as side chains and the group represented by the formula (16-2) as DPPH, the following alignment film materials were synthesized with the following amounts m of a hydrazyl radical-containing monomer unit to be introduced:

(1) an alignment film material formed from a polymer having a main chain derived from a polysiloxane with m=0 (Comparative Example 4);

(2) an alignment film material formed from a polymer having a main chain derived from a polysiloxane with m=0.001 (Example 4-1);

(3) an alignment film material formed from a polymer having a main chain derived from a polysiloxane with m=0.005 (Example 4-2);

(4) an alignment film material formed from a polymer having a main chain derived from a polysiloxane with m=0.01 (Example 4-3); and (5) an alignment film material formed from a polymer having a main chain derived from a polysiloxane with m=0.5 (Example 4-4).

(Production of Liquid Crystal Cell)

A TFT substrate including a vertical photo-alignment-mode ITO electrode and a counter substrate were prepared. The corresponding alignment film material containing a polymer having a main chain derived from a polysiloxane was applied to the substrates, and the workpiece was pre-baked at 90° C. for five minutes and baked at 230° C. for 40 minutes. Thereby, vertical photo-alignment films were obtained which have a chemical structure (containing a cinnamate group) containing the group represented by the formula (15-1) and the group represented by the formula (15-2). Then, the surfaces of the pair of the alignment film substrates were irradiated with 20 mJ/cm$^2$ of linearly polarized ultraviolet light with a center wavelength of 330 nm, so that alignment treatment was performed. On one substrate, an ultraviolet-curable sealant (trade name: Photolec S-WB, Sekisui Chemical Co., Ltd.) was applied in a predetermined pattern using a dispenser. At a predetermined position on the other substrate, a negative liquid crystal composition was dropped. The substrates were attached to each other in a vacuum and the sealant was cured by ultraviolet light. The workpiece was heated at 130° C. for 40 minutes and subjected to re-alignment treatment so that the liquid crystal was converted into an isotropic phase. Then, the workpiece was cooled down to room temperature, and thereby a UV2A-mode liquid crystal cell was obtained.

(High-Temperature Test on Backlight)

The same test as in Example 1 was performed. The results are shown in Table 4.

TABLE 4

|  | Before test | | After 5000-hour test | |
|---|---|---|---|---|
|  | VHR (%) | Contrast | VHR (%) | Contrast |
| m = 0 (Comparative Example 4) | 99.5 | 3000 | 95.5 | 2700 |
| m = 0.001 (Example 4-1) | 99.5 | 3000 | 98.0 | 3000 |
| m = 0.005 (Example 4-2) | 99.5 | 3000 | 99.3 | 3000 |
| m = 0.01 (Example 4-3) | 99.5 | 3000 | 99.3 | 3000 |
| m = 0.5 (Example 4-4) | 95.5 | 2900 | 94.0 | 2850 |

Similar to Examples 3-1 to 3-4 and Comparative Example 3, for the polysiloxane-based alignment film materials, the alignment film material with m=0 (comparative example) showed a reduction in both VHR and contrast after the 5000-hour test on a 75° C. backlight. The reduction in VHR and the reduction in contrast due to the VHR reduction may possibly be caused by slight generation of radicals from the photo-functional groups (cinnamate groups) in the photo-alignment film by the influence of backlight illumination, and the subsequent dissolution of these radicals in the liquid crystal layer and ionization thereof. As the value of m increased, the reduction in VHR almost disappeared and the reduction in contrast also disappeared after the 5000-hour test. This is presumably because the radicals generated from the photo-functional groups were effectively scavenged by the hydrazyl radicals, so that the dissolution of the radicals in the liquid crystal layer and the ionization thereof were reduced. In contrast, when the amount m of the hydrazyl radical-containing monomer unit to be introduced was increased to 0.5, the VHR value and the contrast were low at the beginning even though the hydrazyl radical-containing monomer unit was bonded to the alignment film polymer. This is presumably because radicals were slightly charged, and thus highly stable radicals, such as hydrazyl radicals, may possibly cause a low VHR and a low contrast at the beginning.

The aforementioned liquid crystal display devices of the respective examples may also be applied to production of liquid crystal display devices of a different mode, such as an ECB mode, a TN mode, or a vertical alignment TN (VATN) mode.

Additional Remarks

The following describes examples of preferred embodiments of the alignment film and liquid crystal display device of the present invention. These examples may be appropriately combined within the spirit of the present invention.

As long as the alignment film of the present invention contains a polymer containing a nitrogen radical-containing group and a photo-functional group, it allows the nitrogen radical-containing group to scavenge radicals generated from the photo-functional groups to exert the effects of the invention. Therefore, conventionally known structures can be applied to the other structures of the alignment film of the present invention as appropriate.

The nitrogen radical-containing group is preferably a hydrazyl radical-containing group represented by the following formula (I) or the formula (II):

[Chem. 24]

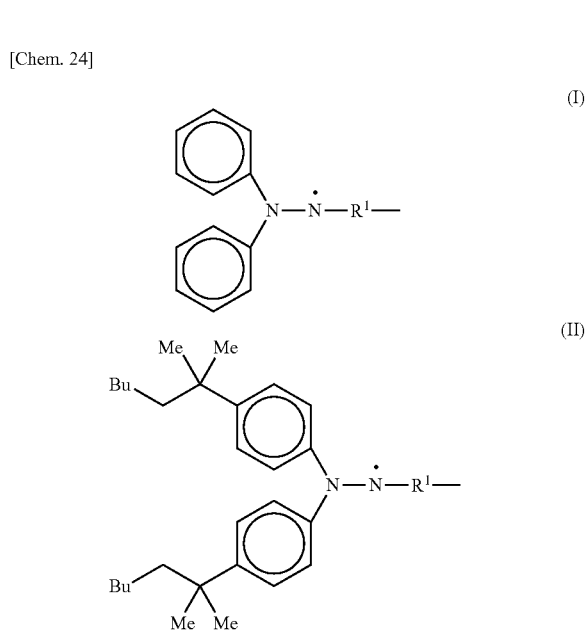

wherein $R^1$ is a direct bond or a divalent organic group; Me is a methyl group; and Bu is a butyl group. Examples of the divalent organic group include C1-C18 saturated or unsaturated alkylene groups, an amino group, an ester group, an amide group, and a substituted or unsubstituted 1,2-phenylene group, 1,3-phenylene group, 1,4-phenylene group, naphthalene-1,4-diyl group, naphthalene-1,5-diyl group, naphthalene-2,6-diyl group, 1,4-cyclohexylene group, 1,4-cyclohexenylene group, 1,4-bicyclo[2,2,2]octylene group, piperidine-1,4-diyl group, decahydronaphthalene-2,6-diyl group, 1,2,3,4-tetrahydronaphthalene-2,6-diyl group, indan-1,3-diyl group, indan-1,5-diyl group, and indan-2,5-diyl group. For substituted groups, examples of the substituent include halogen groups, an amino group, a nitro group, a nitroso group, a cyano group, alkyl groups, alkoxy groups, aryloxy groups, and an acyl group. The divalent organic group is preferably an aromatic group, for example.

The polymer preferably has a main chain derived from a polyamic acid, a polyimide, a polysiloxane, polyacryl, polymethacryl, or polyvinyl.

The polymer is preferably a copolymer that contains a monomer unit containing a photo-functional group and a monomer unit containing a nitrogen radical-containing group.

The photo-functional group is preferably at least one selected from the group consisting of a cinnamate group, an azobenzene group, a chalcone group, a cumarin group, a stilbene group, and a tolane group.

The polymer is preferably a polyamic acid having a structure represented by the following formula (III) and/or a polyimide obtainable by imidizing part of the polyamic acid:

[Chem. 25]

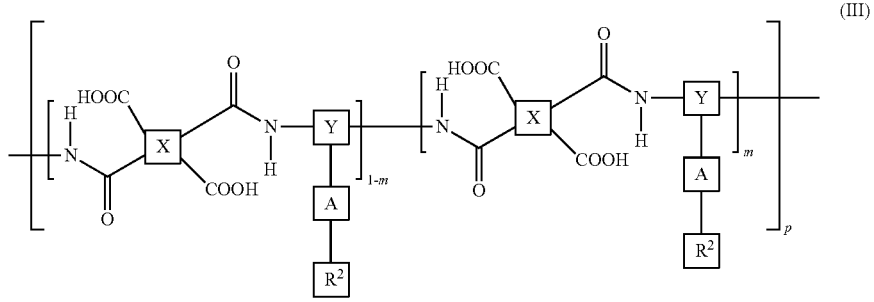

(III)

wherein Xs are the same as or different from each other and each a tetravalent organic group; Ys are the same as or different from each other and each a trivalent organic group; m is greater than 0 and not greater than 0.01; p represents the degree of polymerization, and is an integer of 1 or greater, preferably an integer of 10 or greater; $R^2$s are the same as or different from each other and each a photo-reactive functional group, a vertically aligning group, or a horizontally aligning group; $R^3$ is the hydrazyl radical-containing group; and A is a direct bond or a divalent organic group. Preferred examples of the divalent organic group include the same divalent organic group as mentioned above for $R^1$, and the divalent organic group may be a combination of the divalent organic groups for $R^1$ as mentioned above. Preferred examples of X and Y are as mentioned above.

The polymer is preferably a polysiloxane having a structure represented by the following formula (IV) or the following formula (V):

[Chem. 26]

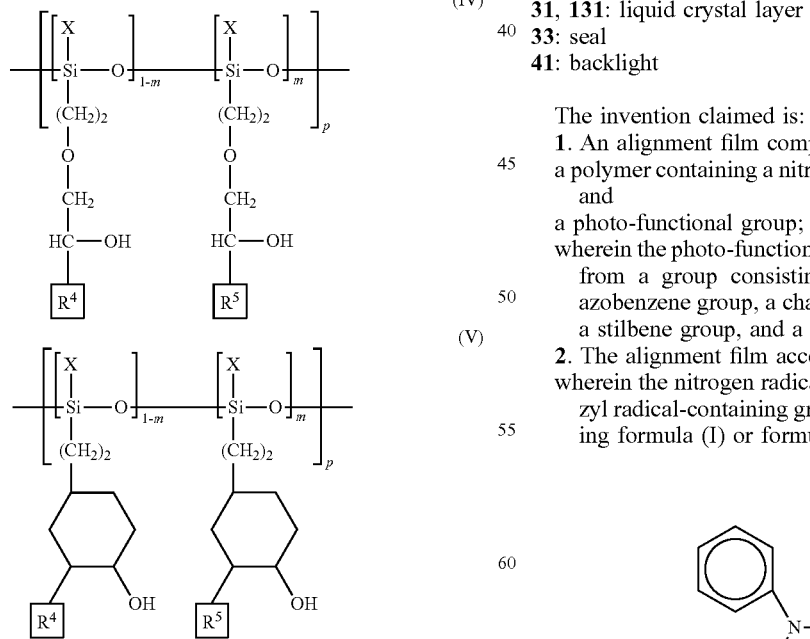

wherein $R^4$s are the same as or different from each other and each a photo-reactive functional group, a vertically aligning group, or a horizontally aligning group; Xs are the same as or different from each other and each a methyl group, an ethyl group, a hydroxy group, a methoxy group, or an ethoxy group; m is greater than 0 and not greater than 0.01; p represents the degree of polymerization, and is an integer of 1 or greater, preferably an integer of 10 or greater; and $R^5$ is the hydrazyl radical-containing group.

The alignment film of the present invention preferably further contains a polyamic acid or a polyimide.

The display mode of the liquid crystal display device of the present invention is preferably the twisted nematic (TN) mode, the electrically controlled birefringence (ECB) mode, the IPS mode, the FFS mode, the VA mode, or the VATN mode.

REFERENCE SIGNS LIST

11: lower glass substrate
13, 23, 113: alignment film
131: photo-functional group
13p: polymer portion
13r: hydrazyl radical
21: upper glass substrate
31, 131: liquid crystal layer
33: seal
41: backlight

The invention claimed is:
1. An alignment film comprising:
   a polymer containing a nitrogen radical-containing group; and
   a photo-functional group;
   wherein the photo-functional group is at least one selected from a group consisting of a cinnamate group, an azobenzene group, a chalcone group, a cumarin group, a stilbene group, and a tolane group.
2. The alignment film according to claim 1,
   wherein the nitrogen radical-containing group is a hydrazyl radical-containing group represented by the following formula (I) or formula (II):

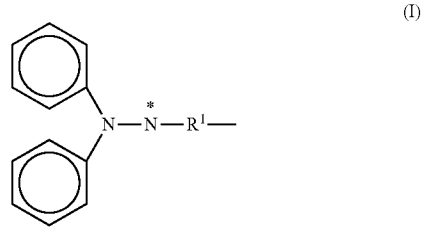

(I)

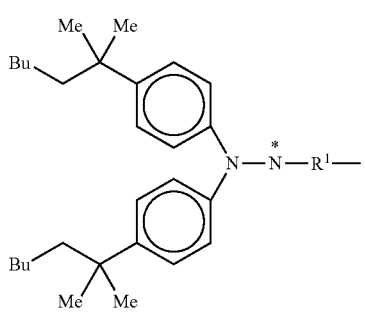

(II)

wherein $R^1$ is a direct bond or a divalent organic group; Me is a methyl group; and Bu is a butyl group.

3. The alignment film according to claim 1, wherein the polymer has a main chain derived from a polyamic acid, a polyimide, a polysiloxane, polyacryl, polymethacryl, or polyvinyl.

4. The alignment film according to claim 1, wherein the polymer is a copolymer that contains a monomer unit containing a photo-functional group and a monomer unit containing a nitrogen radical-containing group.

5. The alignment film according to claim 1, wherein the polymer is a polyamic acid having a structure represented by the following formula (III) and/or a polyimide obtainable by imidizing part of the polyamic acid:

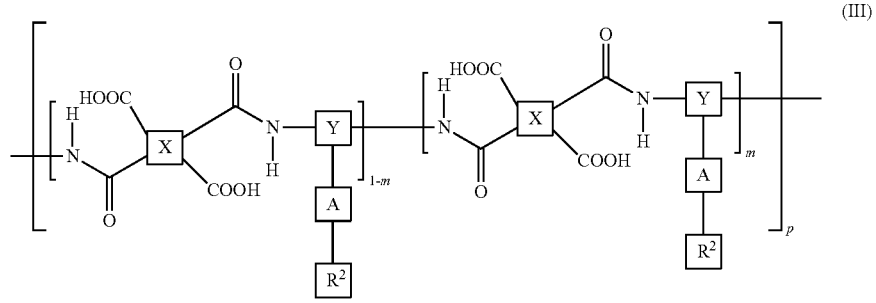

(III)

wherein Xs are the same as or different from each other and each a tetravalent organic group; Ys are the same as or different from each other and each a trivalent organic group; m is greater than 0 and not greater than 0.01; p represents the degree of polymerization, and is an integer of 1 or greater; $R^2$s are the same as or different from each other and each a photo-reactive functional group, a vertically aligning group, or a horizontally aligning group; $R^3$ is the hydrazyl radical-containing group; and A is a direct bond or a divalent organic group.

6. The alignment film according to claim 1, wherein the polymer is a polysiloxane having a structure represented by the following formula (IV) or the following formula (V):

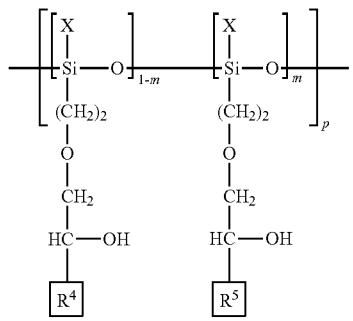

(IV)

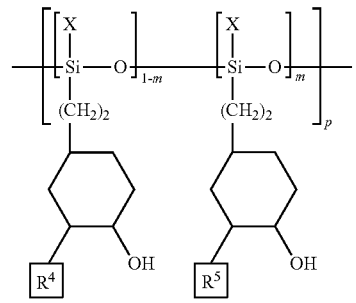

(V)

wherein $R^4$s are the same as or different from each other and each a photo-reactive functional group, a vertically aligning group, or a horizontally aligning group; Xs are the same as or different from each other and each a methyl group, an ethyl group, a hydroxy group, a methoxy group, or an ethoxy group; m is greater than 0 and not greater than 0.01; p represents the degree of polymerization, and is an integer of 1 or greater; and $R^5$ is the hydrazyl radical-containing group.

7. The alignment film according to claim 1, further comprising a polyamic acid or a polyimide.

8. A liquid crystal display device comprising:
the alignment film according to claim 1;
a pair of substrates;
a liquid crystal layer disposed between the substrates; and
a backlight,
the alignment film being disposed between at least one of the substrates and the liquid crystal layer.

9. The liquid crystal display device according to claim 8, wherein the display mode of the liquid crystal display device is the TN mode, the ECB mode, the IPS mode, the FFS mode, the VA mode, or the VATN mode.

* * * * *